(12) United States Patent
Liu (10) Patent No.: US 11,063,374 B2
(45) Date of Patent: Jul. 13, 2021

(54) SYSTEM FOR CONTROLLING ANTENNA PATTERN, METHOD FOR CONTROLLING ANTENNA PATTERN AND WIRELESS ACCESS POINT

(71) Applicant: ACCTON TECHNOLOGY CORPORATION, Hsinchu (TW)

(72) Inventor: I-Ru Liu, Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 97 days.

(21) Appl. No.: 16/706,869

(22) Filed: Dec. 9, 2019

(65) Prior Publication Data

US 2021/0005985 A1    Jan. 7, 2021

(30) Foreign Application Priority Data

Jul. 4, 2019 (TW) .................................. 108123679

(51) Int. Cl.
| | |
|---|---|
| *H01Q 25/00* | (2006.01) |
| *H04B 17/318* | (2015.01) |
| *H04W 24/08* | (2009.01) |
| *H04L 1/00* | (2006.01) |
| *H04W 88/08* | (2009.01) |

(Continued)

(52) U.S. Cl.
CPC ............. *H01Q 25/002* (2013.01); *H04B 7/10* (2013.01); *H04B 17/318* (2015.01); *H04L 1/0003* (2013.01); *H04W 24/08* (2013.01); *H04W 88/08* (2013.01); *H04W 88/12* (2013.01)

(58) Field of Classification Search
CPC ...... H01C 25/002; H04B 17/318; H04B 7/10; H04B 7/0695; H04W 24/08; H04W 88/08; H04W 88/12; H04W 84/12; H04W 24/02; H04L 1/0003; H04L 1/0025
See application file for complete search history.

(56) References Cited

U.S. PATENT DOCUMENTS

| | | | |
|---|---|---|---|
| 7,103,386 B2 * | 9/2006 | Hoffmann ............ | H04B 7/0608 455/562.1 |
| 9,998,189 B1 * | 6/2018 | Liu ...................... | H04B 7/0874 |
| 10,938,113 B1 * | 3/2021 | Kim .................... | H01Q 1/2266 |

(Continued)

*Primary Examiner* — Hassan Kizou
*Assistant Examiner* — Abdullahi Ahmed
(74) *Attorney, Agent, or Firm* — CKC & Partners Co., LLC (57) ABSTRACT

An antenna pattern control system includes a wireless access point, a memory and a processor. The wireless access point includes a plurality of adjustable antennas. Different operative arrangements of the adjustable antennas correspond to a plurality of antenna pattern combinations. The memory stores a plurality of real-time indicators recorded when the adjustable antennas are operating according to these antenna pattern permutations. The processor selects candidate pattern permutations from the antenna pattern permutations according to a cluster distribution of one of the real-time indicators located in a coordinate system. The processor also selects a target pattern permutation from the candidate pattern permutations according to a cluster distribution of at least two of the other real-time indicators. The processor outputs the target pattern permutation to the wireless access point in order to control the adjustable antennas of the wireless access point according to the selected target pattern permutation.

15 Claims, 6 Drawing Sheets

(51) Int. Cl.
*H04W 88/12* (2009.01)
*H04B 7/10* (2017.01)

(56) References Cited

U.S. PATENT DOCUMENTS

| | | | |
|---|---|---|---|
| 2010/0303004 A1* | 12/2010 | Mueck | H04L 1/1819 |
| | | | 370/328 |
| 2013/0157651 A1* | 6/2013 | Khaitan | H04W 52/343 |
| | | | 455/422.1 |
| 2014/0003365 A1* | 1/2014 | Carey | H04W 72/046 |
| | | | 370/329 |
| 2016/0095130 A1* | 3/2016 | Ho | G06F 16/901 |
| | | | 370/329 |
| 2019/0335347 A1* | 10/2019 | Vlachou | H04W 28/0236 |

* cited by examiner

SYSTEM FOR CONTROLLING ANTENNA PATTERN, METHOD FOR CONTROLLING ANTENNA PATTERN AND WIRELESS ACCESS POINT

CROSS-REFERENCE TO RELATED APPLICATION

This application claims priority to Taiwan Application Serial Number 108123679, filed on Jul. 4, 2019, which is herein incorporated by reference.

BACKGROUND

Technical Field

The present disclosure relates to a control system, a control method and a wireless access point. More particularly, the present disclosure relates to a control system, a control method and a wireless access point for controlling antenna pattern permutations.

Description of Related Art

Using antenna control system to adjust antenna pattern of an access point can improve efficiency and coverage of signal transmission. However, most of the current antenna control systems determines antenna pattern only based on the access point's overall received signal strength indications or statistics derived from such indications. Those antenna control systems are vulnerable to channel interference and rogue access points. That is difficult for the system to make a quick and comprehensive determination. Therefore, the current antenna control systems need to be improved.

SUMMARY

Since the prior arts have difficulties of determining antenna pattern in a dynamic manner, the present disclosure provides the following system, method and wireless access point for controlling antenna pattern of wireless access points.

An embodiment of the present disclosure is related to an antenna pattern control system. The antenna pattern control comprises a wireless access point, a memory and a processor. The wireless access point comprises a plurality of antennas. The spatial arrangements of the antennas generate a plurality of antenna pattern permutations when the antennas are in operation. That is, when the antennas are selected to work based on different arrangements and different permutations, synthesis between each antenna pattern correspondingly generates different antenna pattern permutations. The memory stores a plurality of real-time indicators, comprising some real-time signal parameters of each antenna or some signal parameters of the operation, when the wireless access point being operated under the corresponding antenna pattern permutations. The processor couples to the memory to access the real-time indicators, and the processor couples to and controls the wireless access point. The processor obtains a first real-time indicator from the real-time indicators (e.g. RSSI) corresponding to each of the antennas under each of the antenna pattern permutations. The processor selects a plurality of candidate pattern permutations from the antenna pattern permutations based on a cluster distribution of the first real-time indicator under each of the antenna pattern permutations. The processor further evaluates the selected candidate pattern permutations based on at least two of the rest of the real-time indicators. The processor selects a target pattern permutation from the candidate pattern permutations based on a cluster distribution of the at least two of the rest of the real-time indicators corresponding to each of the antenna pattern permutations. The processor outputs an antenna permutation, corresponding to the target pattern permutation, to the wireless access point in order to control the wireless access point to rearrange the antennas based on the antenna permutation.

Another embodiment of the present disclosure is related to an antenna pattern control method. The antenna pattern control method is applied at a wireless access point having a plurality of antennas being arranged based on different arrangements and permutations to generate a plurality of antenna pattern permutations correspondingly. The antenna pattern control method comprises following steps: accessing the real-time indicators, relative signal parameters of the operation antenna of the wireless access point, corresponding to the antenna pattern permutations; obtaining a first real-time indicator from the real-time indicators corresponding to each of the antennas under each of the antenna pattern permutations, for example, RSSI; selecting a plurality of candidate pattern permutations from the antenna pattern permutations based on a cluster distribution of the first real-time indicator under each of the antenna pattern permutations; selecting a target pattern permutation from the candidate pattern permutations based on a cluster distribution of at least two of the rest of the real-time indicators corresponding to each of the antenna pattern permutations; and outputting an antenna permutation, corresponding to the target pattern permutation, to the wireless access point in order to control the wireless access point to rearrange the antennas based on the antenna permutation.

Still another embodiment of the present disclosure is related to a wireless access point. The wireless access point comprises a plurality of antennas, a memory and a processor. The antennas are controlled to operate based on different arrangements and permutations to generate a plurality of antenna pattern permutations correspondingly. The memory stores a plurality of real-time indicators recorded under the corresponding antenna pattern permutations. The processor is coupled to the memory to access the real-time indicators. The processor is coupled to the antennas to control them. The processor obtains a first real-time indicator from the real-time indicators corresponding to each of the antennas under each of the antenna pattern permutations. The processor selects a plurality of candidate pattern permutations from the antenna pattern permutations based on a cluster distribution of the first real-time indicator under each of the antenna pattern permutations. The processor selects a target pattern permutation from the candidate pattern permutations based on a cluster distribution of at least two of the rest of the real-time indicators corresponding to each of the antenna pattern permutations, and rearranges the antennas based on an antenna permutation corresponding to the target pattern permutation.

In one embodiment of the present disclosure, the processor further constructs a first coordinate system based on the first real-time indicators, and the number of the axes of the first coordinate system correspond to a number of the antennas being operated under each of the antenna pattern permutations. The value of each axes of the first coordinate system represents the value of the first real-time indicator of each operating antenna. The processor determines a plurality of clusters of the first real-time indicator in the first coordinate system, based on a distribution of the first real-time indicator corresponding to each of the antenna pattern permutations in the first coordinate system. The processor selects the candidate pattern permutations from the antenna pattern permutations based on a number of the clusters or a distance between the clusters, in the first coordinate system, under each of the antenna pattern permutations.

In another embodiment of the present disclosure, the processor further constructs a second coordinate system having a dimension corresponding to a number of the at least two of the rest of the real-time indicators. The processor determines a plurality of clusters of the at least two of the rest of the real-time indicators in the second coordinate system, based on a distribution of the at least two of the rest of the real-time indicators corresponding to each of the antenna pattern permutations in the second coordinate system. The processor selects the target pattern permutation from the candidate pattern permutations based on densities of the clusters or a distance between the clusters, in the second coordinate system, under each of the antenna pattern permutations.

In the other embodiment of the present disclosure, the processor further normalizes the at least two of the rest of the real-time indicators and divides the second coordinate system into a plurality of classification spaces based on the normalized at least two of the rest of the real-time indicators. The processor selects the target pattern permutation from the candidate pattern permutations if the target pattern permutation corresponding to a first classification space of the classification spaces, wherein most of the at least two of the rest of the real-time indicators fall within the first classification space or the first classification space has a longest distance form an origin of the second coordinate system.

In still another embodiment of the present disclosure, the real-time indicators comprises a received signal strength indication, a number of spatial streams, a modulation, a coding, a bandwidth and a guard interval corresponding to each of the antennas of the wireless access point under each of the antenna pattern permutations.

Based on the embodiments above, the present disclosure provides the antenna pattern control system, the antenna pattern control method and the non-transitory computer readable medium to solve the problem that the prior arts cannot collect data and determine proper antenna pattern permutations dynamically.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the following description, terms used herein are for describing exemplary embodiments but not intended to limit the present disclosure. Singular form terms, such as "a", "the", "this", may be replaced by plural form terms.

In the following description and claims, the terms "first", "second", and the like are not intended to limit a specific order of the units being described.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

Figure 1:
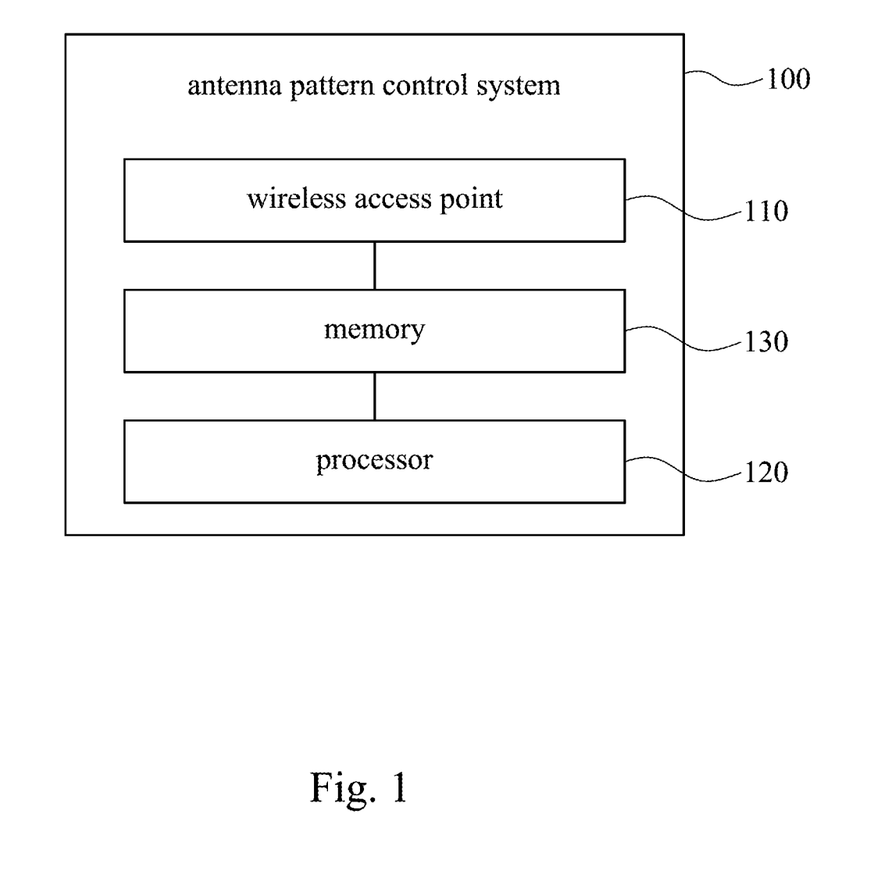
FIG. 1 is a schematic diagram showing an antenna pattern control system according to some embodiments of present disclosure.

FIG. 1 is a schematic diagram showing an antenna pattern control system according to some embodiments of present disclosure. As shown in FIG. 1, in one embodiment, an antenna pattern control system 100 includes a wireless access point 110, a memory 120 and a processor 130. The wireless access point 110 and the memory 120 are both coupled to the processor 130. For instance, in one embodiment, the processor 130 is disposed in an access point (AP) controller. The processor 130 can connect to a network to access the wireless access point 110 via wireless communications (e.g. Wi-Fi) so that they can establish bidirectional information exchange via the network. Or, in another embodiment, the processor 130 and the memory 120 are both settled on the wireless access point controller and being coupled via a physical circuit so that a bidirectional information exchange can be established via the physical cable.

In one embodiment, the wireless access point 110 can be a multi-input multi-output (MIMO) wireless base station coupled to a network. A communication device can connect to the wireless access point 110, as client ends, in a coverage area of the wireless access point 110. It is noted that, in the embodiment, the wireless access point 110 can support IEEE802.11ac standard and compatible with IEEE802.11n and IEEE802.11ax standards. In the embodiment, the wireless access point 110 is deployed with a plurality of antennas that are pattern reconfigurable. Different pattern can have different features, such as different peaks and nulls, etc. These reconfigurable adjustable antennas can be selected as combinations to form multiple selectable antenna pattern permutations.

In one embodiment, the memory 120 can include a non-transitory computer readable medium that stores a computer program. The processor 130 can access the computer program on the memory 120 and execute some predetermined processes (e.g., a method 200 in following paragraphs) based on the computer program, in order to establish specific functions. The functions can be search better antenna pattern permutations from all antenna pattern permutations of the of the wireless access point 110 and control the wireless access point 110 to transmit signals according to the better antenna pattern permutations. It is noted that each antenna pattern permutation of the wireless access point 110 is defined based on specific combinations of pattern features corresponding to these antennas and some physical layer parameters of the wireless access point 110.

In various embodiments, mentioned non-transitory computer readable medium can be, but not limited to, a read only memory, a flash memory, a soft disk, a hard disk, a compact disc, a flash drive, a database accessible via network, or computer readable recording medium with the same functions.

Figure 2:
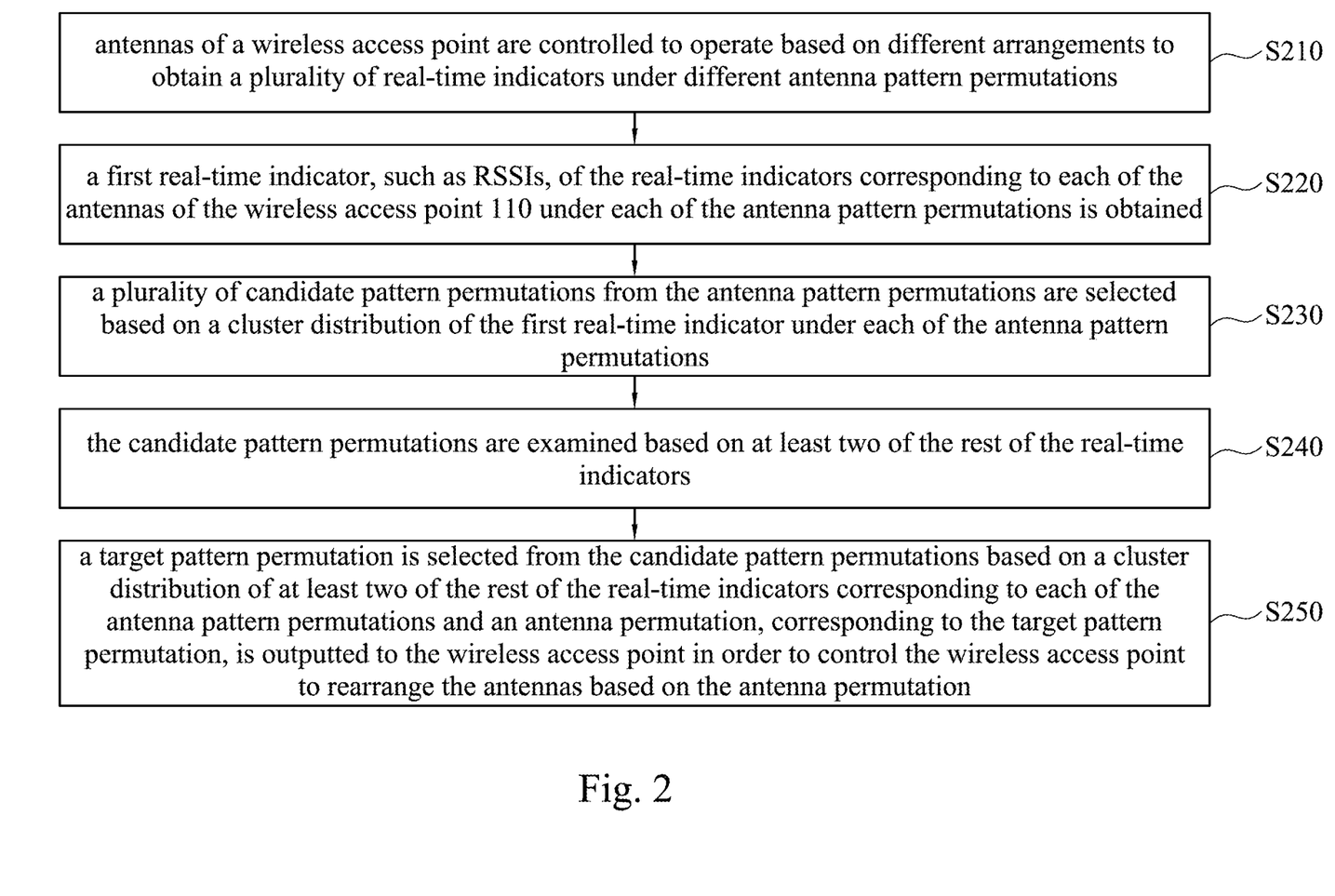
FIG. 2 is a flow chart showing an antenna pattern control method according to some embodiments of present disclosure.

FIG. 2 is a flow chart showing an antenna pattern control method 200 according to some embodiments of present disclosure. In one embodiment, the processor 130, the memory 120 and the wireless access point 110 of FIG. 1 can perform the antenna pattern control method 200 cooperatively. Therefore, the embodiment of FIG. 1 can be referenced. The processor 130 can access the computer program from the memory 120 to perform the antenna pattern control method 200.

Step S210: antennas of a wireless access point are controlled to operate based on different arrangements to obtain a plurality of real-time indicators under different corresponding antenna pattern permutations.

In one embodiment, the processor 130 can control the wireless access point 110 to operate based on every possible antenna pattern permutation and corresponding physical layer parameters to collect operation data as real-time indicators, especially the received signal strength indication (RSSI), when the wireless access point 110 is operating according to these antenna pattern permutation and physical layer parameters. It is noted that the RSSIs can include uplink RSSI and downlink RSSI of each antenna.

In one embodiment, the physical layer parameters further include indicators under IEEE 802.11ac transmission standard and real-time or statistical channel state information (CSI) indicators of the transmission channel. For instance, including, but not limited to, a number of spatial streams, a modulation, a coding, a bandwidth and a guard interval of the wireless access point 110 under each pattern permutation.

In one embodiment, the wireless access point 110 has two adjustable antennas, which are a first antenna and a second antenna. If the first antenna has four patterns and the second antenna has five patterns, the first antenna and the second antenna of the wireless access point 110 can form 20 pattern permutations. In the embodiment, the processor 130 can control the wireless access point 110 so that the wireless access point 110 can establish signal transmissions based on all the twenty different antenna pattern permutations and specific set of physical layer parameters respectively. Under each antenna pattern permutation, the processor 130 can keep recording real-time indicators, such as uplink RSSI, downlink RSSI or other parameters for operating antennas, of each antenna of the wireless access point 110. However, the present disclosure is not limited thereto. It is noted that a number of the real-time indicators being recorded by the processor 130 while the wireless access point 110 operates under the antenna pattern permutations can be different due to different operation periods or different frequencies of recording. Generally, the downlink RSSIs of the wireless access point 110 can be obtained based on feedbacks of a client end. Therefore, if the downlink RSSIs are not available, the wireless access point 110 can use uplink RSSIs instead.

In one embodiment, the processor 130 can store some real-time indicators when the wireless access point 110 is operating under each of the antenna pattern permutations, such as uplink RSSIs, downlink RSSIs and physical layer parameters, in the memory 120. That means at least one of the real-time indicators of the wireless access point 110 under each of the antenna pattern permutations is recorded.

Step S220: a first real-time indicator, such as RSSIs, of the real-time indicators corresponding to each of the antennas of the wireless access point 110 under each of the antenna pattern permutations is obtained.

In one embodiment, the processor 130 can access the real-time indicators from the memory 120. However, in each time the antenna pattern control method 200 is performed, the processor 130 can only focus on one of the uplink RSSI or the downlink RSSI.

In the embodiment, the processor 130 can access the RSSIs of the first antenna and the second antenna of the wireless access point 110 being operated under each antenna pattern permutation as the first real-time indicator.

Step S230: a plurality of candidate pattern permutations from the antenna pattern permutations are selected based on a cluster distribution of the first real-time indicator under each of the antenna pattern permutations.

In this embodiment, the processor 130 can determine a distribution of the RSSIs of the wireless access point 110 under all possible antenna pattern permutations and physical layer parameters and then select some candidate pattern permutations from all the antenna pattern permutations based on the distribution.

In the embodiment, the processor 130 can access each antenna's RSSI when the wireless access point 110 is operating under different antenna pattern permutations. The processor 130 can further normalize the RSSIs for following procedures. For example, if the RSSIs are recorded in a range of −95 dBm to 0 dBm, the processor 130 can map values of these uplink RSSIs to a range of 1-96.

The processor 130 can further fill each RSSI (or the normalized RSSI) into a coordinate system to determine a distribution of RSSIs (or a first real-time indicator) in the coordinate system.

Figure 3:
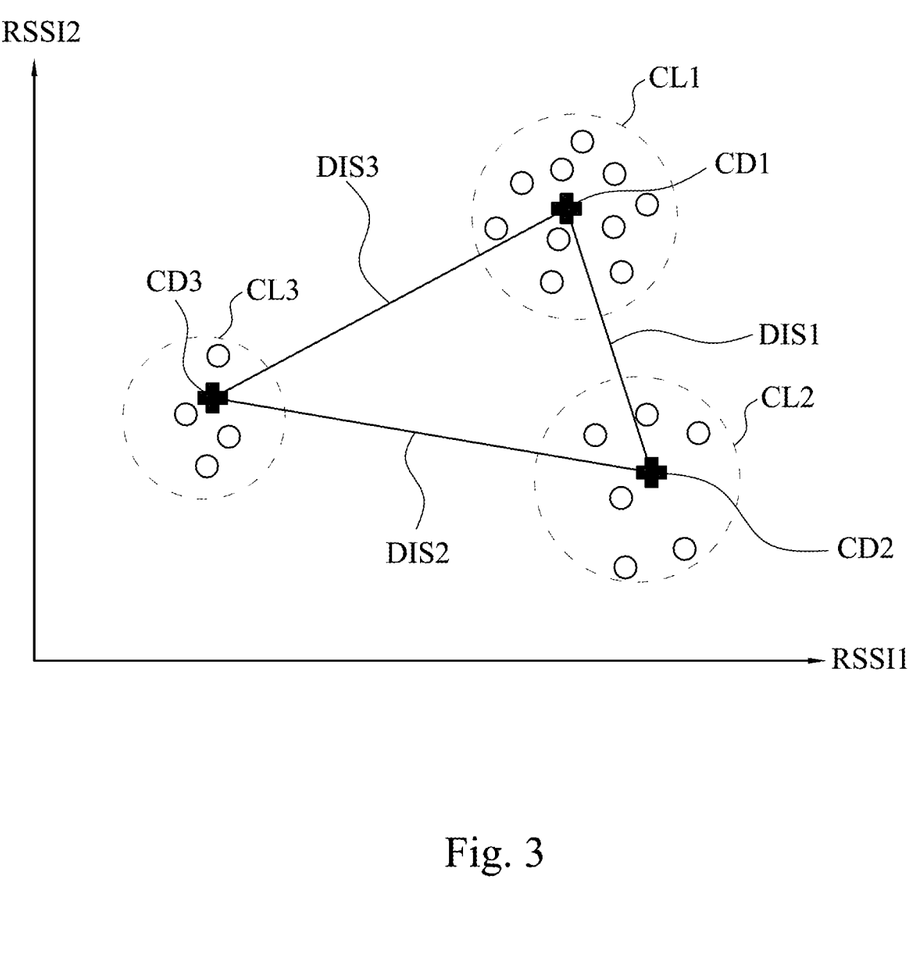
FIG. 3 is a schematic diagram showing an antenna pattern permutation according to some embodiments of present disclosure.

For better understandings of the present disclosure, reference can be made to FIG. 3. FIG. 3 is a schematic diagram showing a RSSI distribution of an antenna pattern permutation according to some embodiments of present disclosure. In this embodiment, since there are only two antennas of the wireless access point 110 are in operation, each axis of the coordinate system can show RSSIs of one of the antennas respectively. It is seen that the coordinate system is a two dimensional planar coordinate system corresponding to two operating antennas. The number of operative antennas decides the dimension of the coordinate system. The horizontal axis of the coordinate system corresponds to RSSIs of the first antenna of the wireless access point 110 (marked as RSSI1). The vertical axis of the coordinate system corresponds to RSSIs of the second antenna of the wireless access point 110 (marked as RSSI2). The RSSIs (or normalized RSSIs) of each antenna of the wireless access point 110 under different antenna pattern permutations can be marked in the coordinate system of FIG. 3. Each node falling in the coordinate system corresponds to a cross point that the RSSIs of the first antenna and the second antenna of the wireless access point 110 being operated under a specific antenna pattern permutation. In other words, the nodes in the coordinate system can represent each antenna's RSSI when the wireless access point 110 is operating under the specific antenna pattern permutation. It is noted that each antenna pattern permutation of the wireless access point 110 can construct a corresponding coordinate system with RSSIs distributed therein.

In one embodiment, the processor 130 can control the wireless access point 110 to operate under each of the antenna pattern permutations one by one. When the RSSIs corresponding to one of the antenna pattern permutations being recorded in a specific operating period (e.g. a predetermined period) are marked in a coordinate system, the processor 130 can determine a distribution of the RSSIs under the antenna pattern permutation in the coordinate system, especially clusters of the RSSIs in the coordinate system. The horizontal axis and the vertical axis of the coordinate system represent the RSSIs of the first antenna and the second antenna of the wireless access point 110, respectively. Compact clusters or fewer clusters in the coordinate system can mean that the values of the RSSIs presented by two dimensions under the antenna pattern permutation are close to each other. In such case, the RSSI nodes are close to each other in the coordinate system to form less clusters but with high cluster densities. Diffused clusters or more clusters in the coordinate system can mean that the values of the RSSIs presented by two dimensions under the antenna pattern permutation are dispersive and far from each other. It is understood that, a cluster of the normalized first real-time indicator can be determined by some blocks formed by a fixed range along the axis of the coordinate system or a predetermined range of the user (e.g. in a fixed radius). However, the present disclosure is not limited thereto.

As shown in FIG. 3, in a coordinate system, the RSSIs that the wireless access point 110 is operating under a specific antenna pattern permutation substantially show three clusters, which are a first cluster CL1, a second cluster CL2 and a third cluster CL3. The first cluster CL1, including ten RSSI nodes, falls at the top right of the coordinate system. The second cluster CL2, including six RSSI nodes, falls at the bottom right of the coordinate system. The third cluster CL3, including four RSSI nodes, falls at the bottom left of the coordinate system. It is understood that the numbers of RSSI nodes and the numbers of clusters are not intended to limit the scope of the present disclosure. As mentioned, the number of the RSSIs of the wireless access point 110 can be different based on the different time of operation and frequency of sampling.

In one embodiment, the processor 130 can calculate a centroid of each of the first cluster CL1, the second cluster CL2 and the third cluster CL3 in the coordinate system. The centroid of a cluster corresponds to an average of all the RSSI nodes in the cluster. A centroid can have one of a shortest Euclidean distance, a shortest Manhattan distance, a shortest squared error or a shortest absolute error from all the nodes in the cluster. For instance, a first centroid CD1 of the first cluster CL1 can have the shortest Euclidean distance or the shortest squared error from all the nodes of the first cluster CL1. Similarly, a second centroid CD2 of the second cluster CL2 and a third centroid CD3 of the third cluster CL3 can have the same property in their clusters. It is understood that the centroid itself may not be a real node of the cluster but a point has the shortest distance from all the nodes of the cluster.

After the processor 130 obtains the first centroid CD1, the second centroid CD2 and the third centroid CD3, the processor 130 can calculate distances between each two of the centroids. As shown in FIG. 3. A distance between the first centroid CD1 and the second centroid CD2 can refer to a first distance DIS1. A distance between the second centroid CD2 and the third centroid CD3 can refer to a second distance DIS2. A distance between the third centroid CD3 and the first centroid CD1 can refer to a third distance DIS3. In this embodiment, the second distance DIS2 is longer than the first distance DIS1 and the third distance DIS3, and the third distance DIS3 is longer than the first distance DIS1.

Figure 4:
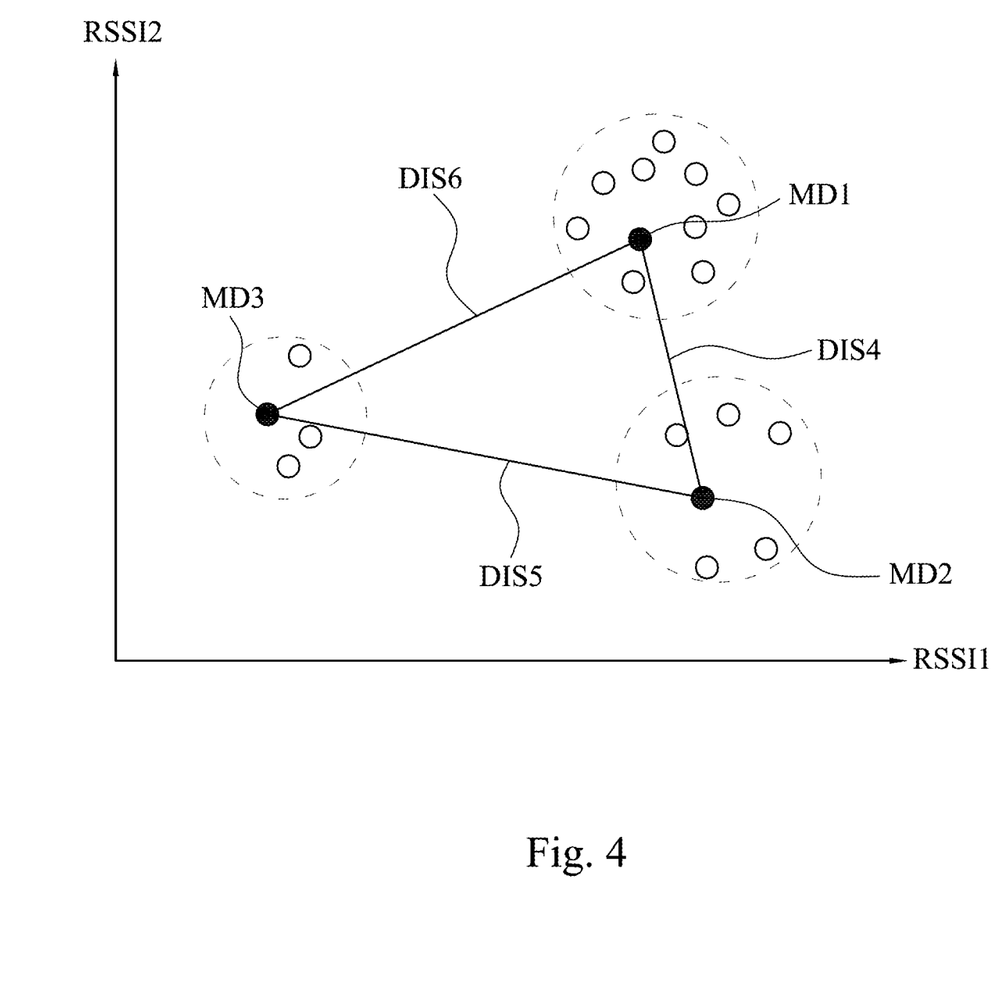
FIG. 4 is a schematic diagram showing an antenna pattern permutation according to some embodiments of present disclosure.

In another embodiment, the processor 130 can determine a medoid of each of the first cluster CL1, the second cluster CL2 and the third cluster CL3. For better understandings of the present disclosure, reference can be made to FIG. 4. FIG. 4 is a schematic diagram showing a distribution of real-time indicators under another antenna pattern permutation according to some embodiments of present disclosure. Similar to FIG. 3, there are three clusters, the first cluster CL1, the second cluster CL2 and the third cluster CL3. However, the medoids of the clusters are real nodes belong to the clusters and such nodes have a shortest distance from other nodes in their clusters. The shortest distance can refer to a shortest Euclidean distance, a shortest Manhattan distance or a minimum difference of absolute error.

As shown in FIG. 4, a first medoid MD1 of the first cluster CL1 is a node of the first cluster CL1 and the first medoid MD1 has a shortest distance from each of the nodes in the first cluster CL1. Similarly, a second medoid MD2 of the second cluster CL2 and a third medoid MD3 of the third cluster CL3 have the same properties in their own clusters.

In the same manner, after the processor 130 obtains the first medoid MD1, the second medoid MD2 and the third medoid MD3, the processor 130 can calculate distances between each two of the medoids. As shown in FIG. 4, a distance between the first medoid MD1 and the second medoid MD2 is a fourth distance DIS4. A distance between the second medoid MD2 and the third medoid MD3 is a fifth distance DIS5. A distance between the third medoid MD3 and the first medoid MD1 is a sixth distance DIS6. In this embodiment, the fifth distance DIS5 is longer than the fourth distance DIS4 and the sixth distance DIS6, and the sixth distance DIS6 is longer than the fourth distance DIS4.

In one embodiment, based on the RSSIs that the wireless access point 110 is operating under all the antenna pattern permutations, the processor 130 can construct a plurality of coordinate systems corresponding to all the antenna pattern permutations of the wireless access point 110. The processor 130 can determine clusters of the RSSIs in each of the coordinate systems and calculate centroids (or medoids) of each cluster.

After the processor 130 obtains the clusters in each coordinate system corresponding to each antenna pattern permutation, the processor 130 can use specific cluster determination logic to process with the distributions in the coordinate systems under different antenna pattern permutations, in order to select some candidate pattern permutations from all the antenna pattern permutations of the wireless access point 110. It is noted that said specific cluster determination logic can include, at least two but not limited to, types of determination logics. In one embodiment, the first determination logic of the processor 130 is to select the antenna pattern permutations having most clusters in their coordinate system. The purpose of the first determination logic can be considered selecting the antenna pattern permutations that cover most client ends. In another embodiment, the second determination logic of the processor 130 is to select the antenna pattern permutations having clusters distanced from each other the most in their coordinate system. In the foregoing embodiment, in this coordinate system, the processor 130 can calculate an average distance between each two centroids of the first cluster CL1, the second cluster CL2 and the third cluster CL3. The processor 130 can then compare this average distance with other average distances corresponding to other coordinate systems under different antenna pattern permutations, in order to select the antenna pattern permutations having the longest average distance in their coordinate systems. It is noted that the second determination logic is to select the antenna pattern permutations with the largest client coverage area.

Based on the needs of a user of antenna pattern control system 100, the processor 130 can use first determination logic or second determination logic to establish the selection of the candidate pattern permutations. Exemplary embodiments are shown below.

As shown in FIG. 3 or FIG. 4, in one embodiment, the processor 130 can count a total number of clusters, including the first cluster CL1, the second cluster CL2, the third cluster CL3 and the others, in the coordinate system according to the first determination logic. The processor 130 can compare total number of clusters of the coordinate systems corresponding to all antenna pattern permutations and select the antenna pattern permutations having most clusters in their coordinate system as candidate pattern permutations. For example, in the embodiments of FIG. 3 or FIG. 4, the coordinate system of RSSI distribution under one antenna pattern permutation shows three clusters of RSSIs in total. If other coordinate systems under other antenna pattern permutations show at most three clusters of RSSIs, the processor 130 can select this antenna pattern permutation as one of the candidate pattern permutations based on the first determination logic.

As shown in FIG. 3 or FIG. 4, in one embodiment, the processor 130 can select the candidate pattern permutations based on second determination logic. As shown in FIG. 3, in one embodiment, the processor 130 can calculate an average cluster density of the clusters in each coordinate system. For example, in the embodiment of FIG. 3, an average distance between the centroids, which are the first distance DIS1, the second distance DIS2 and the third distance DIS3, can be calculated. For example, in the embodiment of FIG. 4, an average distance between the medoids, which are the fourth distance DIS4, the fifth distance DIS5 and the sixth distance DIS6, can be calculated. These average distances, as being average cluster densities of the coordinate systems under each antenna pattern permutation, can be compared to each other and the antenna pattern permutations having lowest cluster densities (i.e., the lowest average distances) can be selected as candidate pattern permutations.

Step S240: the candidate pattern permutations are examined based on at least two of the rest of the real-time indicators.

In one embodiment, after the processor 130 selects the candidate pattern permutations according to the cluster distribution of the first real-time indicator, the processor 130 can further use at least two other real-time indicators to choose at least one target antenna pattern permutation from the candidate pattern permutations.

In one embodiment, the processor 130 can choose at least two parameters from the numbers of spatial streams, the modulation, the coding, the bandwidth and the guard interval. The processor 130 can build the coordinate system with the chosen at least two real-time indicators, as the same way as the foregoing. Or the real-time indicators can be normalized to classify the candidate pattern permutations.

For instance, in one embodiment, the processor 130 can select the number of spatial streams and the bandwidth from the real-time indicators to construct a coordinate system. Two selected parameters can form a two-dimension planar coordinate system. The processor 130 can execute a normalization process to determine values corresponding to an axis of the number of spatial streams and an axis of the bandwidth in the coordinate system. In an exemplary case of the number of spatial streams, since the number of spatial streams has already been represented in integers 1-4 (1, 2, 3 or 4), the numbers of spatial streams after the normalization process can still be shown in integers 1-4. In an exemplary case of the bandwidth, since the bandwidths are represented in a range of 20-160 (20, 40, 80 or 160) MHz, the processor 130 can use the normalization process to map the value of bandwidths into a range of integers 1-4. That is, after the normalization process, the value of the bandwidths are replaced by integers 1-4. Integer 1 corresponds to 20 MHz, integer 2 corresponds to 40 MHz, integer 3 corresponds to 80 MHz, and integer 4 corresponds to 160 MHz.

It is noted that the foregoing embodiments are not intended to limit the scope of the present disclosure. In alternative embodiments, the processor 130 can construct the coordinate system using other real-time indicators. The number of the chosen real-time indicators and the way the indicators being normalized are not limited thereto. Due to the loads of computation and the transmission, the processor 130 of the present closure can choose highly related real-time indicators to construct the coordinate system.

Figure 5:
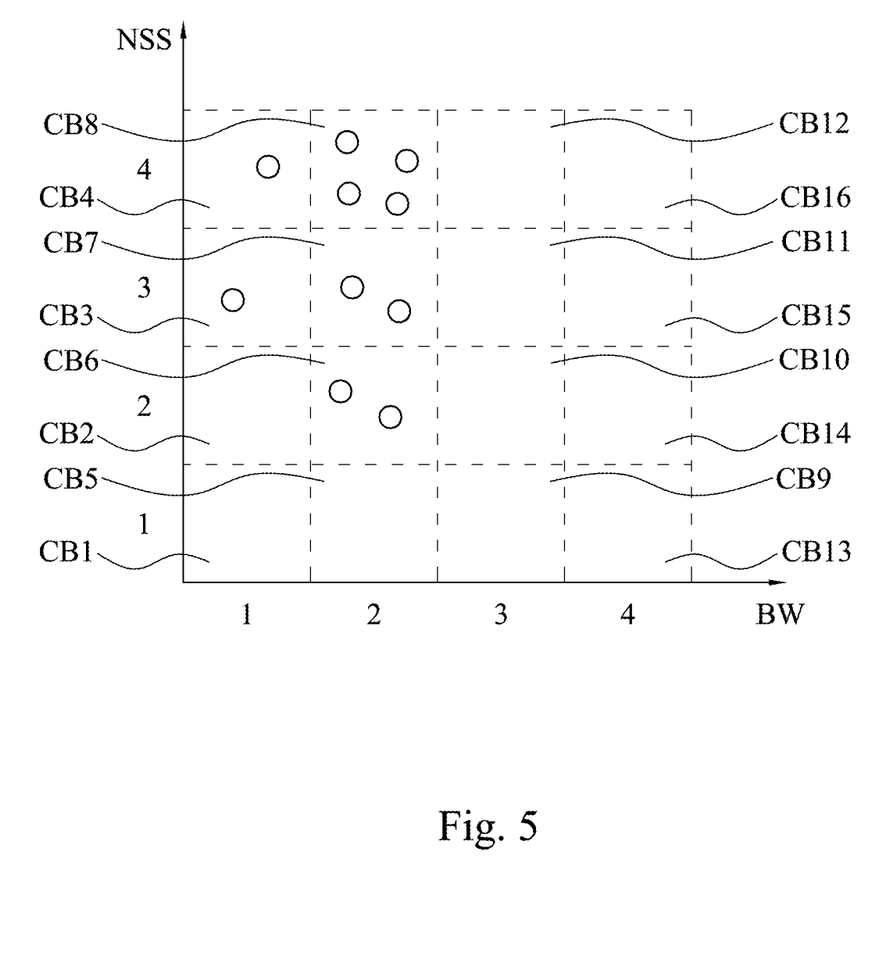
FIG. 5 is a schematic diagram showing an antenna pattern permutation according to some embodiments of present disclosure.

Reference can be made to FIG. 5. FIG. 5 is a schematic diagram showing an antenna pattern permutation according to some embodiments of present disclosure. As shown in FIG. 5, two real-time indicators are chosen for the construction of the coordinate system in the embodiment. The coordinate system is a two-dimension planar system. A vertical axis of the coordinate system shows the number of spatial streams (marked as NSS) when the wireless access point 110 is operated under one antenna pattern permutation. A horizontal axis of the coordinate system shows the bandwidth (marked as BW) when the wireless access point 110 is operated under one antenna pattern permutation. As normalization, as shown in FIG. 5, the integers of the coordinate system can be connected to divide the coordinate system into sixteen blocks, which are classification spaces CB1-CB16.

In one embodiment, the processor 130 can fill nodes corresponding to the candidate pattern permutations into the blocks of the coordinate system based on the numbers of spatial streams and the bandwidths, in order to determine the distributions of these nodes of candidate pattern permutations in the coordinate system. For instance, in a record of a candidate pattern permutation, the number of spatial streams is one and the bandwidth is 160 MHz, the processor 130 can fill a node into the classification space CB13 at the bottom right corner of the coordinate system. In another record of the same candidate pattern permutation, the number of spatial streams is four and the bandwidth is 160 MHz, the processor 130 can fill a node into the classification space CB16 at the top right corner of the coordinate system.

As mentioned, when the processor 130 selects a candidate pattern permutation, the processor 130 can fills nodes according to the numbers of spatial streams and the bandwidths into the blocks of the coordinate system corresponding to this candidate pattern permutation, in order to find a two dimensional distribution of the numbers of spatial streams and the bandwidths under this candidate pattern permutation. In the coordinate system of FIG. 5 that represents a candidate pattern permutation, the node distribution can be shown below. The classification space CB8 contains four nodes, and the nodes correspond to four records of two dimensional values of the numbers of spatial streams and the bandwidths. The classification space CB7 contains two nodes, and the nodes correspond to two records of two dimensional values of the numbers of spatial streams and the bandwidths. The classification space CB6 contains two nodes, and the nodes correspond to two records of two dimensional values of the numbers of spatial streams and the bandwidths. The classification space CB4 contains one node, and the node corresponds to one record of two dimensional value of the numbers of spatial streams and the bandwidths. The classification space CB3 contains one node, and the node corresponds to one record of two dimensional value of the numbers of spatial streams and the bandwidths.

Step S250: a target pattern permutation is selected from the candidate pattern permutations based on a cluster distribution of at least two of the rest of the real-time indicators corresponding to each of the candidate antenna pattern permutations and an antenna permutation, corresponding to the target pattern permutation, is outputted to the wireless access point in order to control the wireless access point to rearrange the antennas based on the antenna permutation.

In one embodiment, after the processor 130 builds coordinate systems corresponding to the candidate pattern permutations, the processor 130 can select a target pattern permutation from the candidate pattern permutations based on some specific determination logics so that the wireless access point 110 can cover most clients or a largest coverage area.

For instance, as shown in FIG. 5, the processor 130 can select preferred antenna pattern permutations based on at least two specific determination logics. In one embodiment, the processor 130 can select a best antenna pattern permutation from the candidate pattern permutations according to a third determination logic, which is to select a classification space that contains most nodes of antenna pattern permutations from the classification space CB1-CB16 in the corresponding coordinate system. The logic is selecting the cluster with a highest density of records. In another embodiment, the processor 130 can select a best antenna pattern permutation from the candidate pattern permutations according to a fourth determination logic, which is to select a classification space having a largest norm among all the classification space CB1-CB16 in the corresponding coordinate system. The logic is selecting the cluster that is farthest from an origin of the coordinate system.

As shown in FIG. 5, in one embodiment, the processor 130 can use the third determination logic or the fourth determination logic to select the best pattern permutation from the classification space CB1-CB16. As shown in the figure, in the coordinate systems of all the candidate pattern permutations, the classification space CB8 contains most nodes corresponding to the number of spatial streams and bandwidths and the classification space CB8 has a largest norm. Therefore, processor 130 can choose the candidate pattern permutations corresponding to the classification space CB8 as the best pattern permutations, which are the target pattern permutations. In this embodiment, the processor 130 can control the first antenna and the second antenna of the wireless access point 110 being arranged according to the target pattern permutations.

It is noted that the numbers of the foregoing embodiments are not intended to limit the scope of the present disclosure. In one embodiment, the wireless access point 110 can have three or four adjustable antennas. In such configuration, the processor 130 can construct the first coordinate system with three dimensions or four dimensions based on the antenna pattern permutations of the wireless access point 110 and determine the clusters of the RSSIs of the wireless access point 110 under all the antenna pattern permutations. The processor 130 can construct the coordinate system based on the RSSIs and determine the cluster distribution when the wireless access point 110 is operating under each of the antenna pattern permutations.

Furthermore, the processor 130 can choose two to five other real-time indicators from mentioned real-time indicators to construct a multi-dimensional second coordinate system to classify the candidate pattern permutations.

Figure 6:
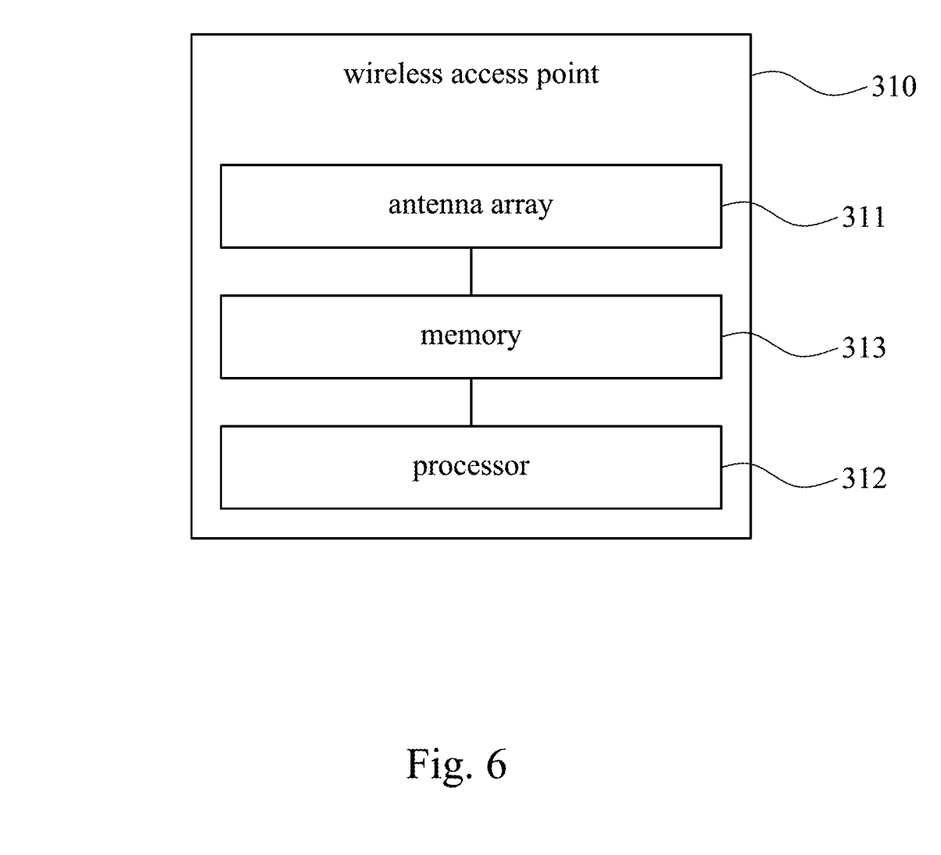
FIG. 6 is a schematic diagram showing a wireless access point according to some embodiments of present disclosure.

FIG. 6 is a schematic diagram showing a wireless access point 110 according to some embodiments of present disclosure. As shown in FIG. 6, in one embodiment, the wireless access point 310 includes an antenna array 311, a memory 312 and a processor 313. The processor 313 is coupled to the antenna array 311 and the memory 312. The processor 313 can access information in the memory 312 and control the antenna array 311. The antenna array 311 of the wireless access point 310 includes a plurality of antennas and the antennas can be arranged to generate a plurality of antenna pattern permutations.

As shown in FIG. 6, in the embodiment, the memory 312 can have the same function of the memory 120 in the embodiments of FIGS. 1-5. That is, in the embodiment, the memory 312 can store the real-time indicators corresponding to the antenna array 311 under every pattern permutations.

As shown in FIG. 6, the processor 313 can have the same function of the processor 130 in the embodiments of FIGS. 1-5. It is to say, in the embodiment, the processor 313 can access the real-time indicators from the memory 312 and obtain a first real-time indicator corresponding to the antenna array 311 under every pattern permutations. The processor 313 can select some candidate pattern permutations according to the clusters of the first real-time indicator under each antenna pattern permutations. The processor 313 can further examine the selected candidate pattern permutations based on at least two of the other real-time indicators, and select a target pattern permutation based on clusters of the other two real-time indicators under each candidate pattern permutation. The processor 313 can adjust antennas of the antenna array 311 according to the target pattern permutation so that the antenna array 311 can operates under the target pattern permutation. In view of the foregoing embodiments, the present disclosure provides following advantages. The antenna pattern control system, the antenna pattern control method and the wireless access point of the present disclosure can determine better antenna pattern permutations and physical parameters by analyzing massive datasets of possible antenna pattern permutations of the wireless access point 110. In this way, the processor 130 (or the processor 113) can control the antennas of the wireless access point 110 dynamically so that the wireless access point 110 can cover most client ends or largest coverage area.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A antenna pattern control system, comprising:
a wireless access point, comprising a plurality of antennas operating based on different arrangements to generate a plurality of antenna pattern permutations correspondingly;
a memory, stores a plurality of real-time indicators corresponding to the plurality of antenna pattern permutations; and a processor, coupled to the memory to access the real-time indicators and coupled to the wireless access point to control the wireless access point, wherein the processor is configured to:
obtain a first real-time indicator from the real-time indicators corresponding to each of the antennas under each of the antenna pattern permutations;
select a plurality of candidate pattern permutations from the antenna pattern permutations based on a cluster distribution of the first real-time indicator under each of the antenna pattern permutations;
select a target pattern permutation from the candidate pattern permutations based on a cluster distribution of at least two of the rest of the real-time indicators corresponding to each of the antenna pattern permutations; and
output an antenna permutation, corresponding to the target pattern permutation, to the wireless access point in order to control the wireless access point to rearrange the antennas based on the antenna permutation.

2. The antenna pattern control system of claim 1, wherein the processor is further configured to:
construct a first coordinate system based on a number of the antennas operating under each of the antenna pattern permutations;
determine a plurality of clusters of the first real-time indicator in the first coordinate system, based on a distribution of the first real-time indicator corresponding to each of the antenna pattern permutations in the first coordinate system; and
select the candidate pattern permutations from the antenna pattern permutations based on a number of the clusters or a distance between the clusters, in the first coordinate system, under each of the antenna pattern permutations.

3. The antenna pattern control system of claim 1, wherein the processor is further configured to:
construct a second coordinate system having a dimension corresponding to a number of the at least two of the rest of the real-time indicators;
determine a plurality of clusters of the at least two of the rest of the real-time indicators in the second coordinate system, based on a distribution of the at least two of the rest of the real-time indicators corresponding to each of the antenna pattern permutations in the second coordinate system; and
select the target pattern permutation from the candidate pattern permutations based on densities of the clusters or a distance between the clusters, in the second coordinate system, under each of the antenna pattern permutations.

4. The antenna pattern control system of claim 3, wherein the processor is further configured to:
normalize the at least two of the rest of the real-time indicators;
divide the second coordinate system into a plurality of classification spaces based on the normalized at least two of the rest of the real-time indicators; and
select the target pattern permutation from the candidate pattern permutations if the target pattern permutation corresponding to a first classification space of the classification spaces, wherein most of the at least two of the rest of the real-time indicators fall within the first classification space or the first classification space has a longest distance form an origin of the second coordinate system.

5. The antenna pattern control system of claim 1, wherein the real-time indicators comprises a received signal strength indication, a number of spatial streams, a modulation, a coding, a bandwidth and a guard interval corresponding to each of the antennas of the wireless access point under each of the antenna pattern permutations.

6. An antenna pattern control method, applied at a wireless access point having a plurality of antennas operating based on different arrangements to generate a plurality of antenna pattern permutations correspondingly, and the antenna pattern control method comprising:
accessing the real-time indicators s corresponding to the antenna pattern permutations;
obtaining a first real-time indicator from the real-time indicators corresponding to each of the antennas under each of the antenna pattern permutations;
selecting a plurality of candidate pattern permutations from the antenna pattern permutations based on a cluster distribution of the first real-time indicator under each of the antenna pattern permutations;
selecting a target pattern permutation from the candidate pattern permutations based on a cluster distribution of at least two of the rest of the real-time indicators corresponding to each of the antenna pattern permutations; and
outputting an antenna permutation, corresponding to the target pattern permutation, to the wireless access point in order to control the wireless access point to rearrange the antennas based on the antenna permutation.

7. The antenna pattern control method of claim 6, wherein selecting the candidate pattern permutations from the antenna pattern permutations comprising:
constructing a first coordinate system based on a number of the antennas operating under each of the antenna pattern permutations;
determining a plurality of clusters of the first real-time indicator in the first coordinate system, based on a distribution of the first real-time indicator corresponding to each of the antenna pattern permutations in the first coordinate system; and
selecting the candidate pattern permutations from the antenna pattern permutations based on a number of the clusters or a distance between the clusters, in the first coordinate system, under each of the antenna pattern permutations.

8. The antenna pattern control method of claim 6, wherein selecting the target pattern permutation based on the at least two of the rest of the real-time indicators comprising:
constructing a second coordinate system having a dimension corresponding to a number of the at least two of the rest of the real-time indicators;
determining a plurality of clusters of the at least two of the rest of the real-time indicators in the second coordinate system, based on a distribution of the at least two of the rest of the real-time indicators corresponding to each of the antenna pattern permutations in the second coordinate system; and
selecting the target pattern permutation from the candidate pattern permutations based on densities of the clusters or a distance between the clusters, in the second coordinate system, under each of the antenna pattern permutations.

9. The antenna pattern control method of claim 8, wherein selecting the target pattern permutation further comprising:
normalizing the at least two of the rest of the real-time indicators;
dividing the second coordinate system into a plurality of classification spaces based on the normalized at least two of the rest of the real-time indicators; and selecting the target pattern permutation from the candidate pattern permutations if the target pattern permutation corresponding to a first classification space of the classification spaces, wherein most of the at least two of the rest of the real-time indicators fall within the first classification space or the first classification space has a longest distance form an origin of the second coordinate system.

10. The antenna pattern control method of claim 6, wherein the real-time indicators comprises a received signal strength indication, a number of spatial streams, a modulation, a coding, a bandwidth and a guard interval corresponding to each of the antennas of the wireless access point under each of the antenna pattern permutations.

11. A wireless access point, comprising:
a plurality of antennas, operating based on different arrangements to generate a plurality of antenna pattern permutations correspondingly;
a memory, stores a plurality of real-time indicators recorded under the antenna pattern permutations; and
a processor, coupled to the memory to access the real-time indicators and coupled to the wireless access point to control the wireless access point, wherein the processor is configured to:
obtain a first real-time indicator from the real-time indicators corresponding to each of the antennas under each of the antenna pattern permutations;
select a plurality of candidate pattern permutations from the antenna pattern permutations based on a cluster distribution of the first real-time indicator under each of the antenna pattern permutations;
select a target pattern permutation from the candidate pattern permutations based on a cluster distribution of at least two of the rest of the real-time indicators corresponding to each of the antenna pattern permutations; and
rearrange the antennas based on an antenna permutation corresponding to the target pattern permutation.

12. The wireless access point of claim 11, wherein the processor is further configured to:
construct a first coordinate system based on a number of the antennas being operated under each of the antenna pattern permutations;
determine a plurality of clusters of the first real-time indicator in the first coordinate system, based on a distribution of the first real-time indicator corresponding to each of the antenna pattern permutations in the first coordinate system; and
select the candidate pattern permutations from the antenna pattern permutations based on a number of the clusters or a distance between the clusters, in the first coordinate system, under each of the antenna pattern permutations.

13. The wireless access point of claim 11, wherein the processor is further configured to:
construct a second coordinate system having a dimension corresponding to a number of the at least two of the rest of the real-time indicators;
determine a plurality of clusters of the at least two of the rest of the real-time indicators in the second coordinate system, based on a distribution of the at least two of the rest of the real-time indicators corresponding to each of the antenna pattern permutations in the second coordinate system; and
select the target pattern permutation from the candidate pattern permutations based on densities of the clusters or a distance between the clusters, in the second coordinate system, under each of the antenna pattern permutations.

14. The wireless access point of claim 13, wherein the processor is further configured to:
normalize the at least two of the rest of the real-time indicators;
divide the second coordinate system into a plurality of classification spaces based on the normalized at least two of the rest of the real-time indicators; and
select the target pattern permutation from the candidate pattern permutations if the target pattern permutation corresponding to a first classification space of the classification spaces, wherein most of the at least two of the rest of the real-time indicators fall within the first classification space or the first classification space has a longest distance form an origin of the second coordinate system.

15. The wireless access point of claim 11, wherein the real-time indicators comprises a received signal strength indication, a number of spatial streams, a modulation, a coding, a bandwidth and a guard interval corresponding to each of the antennas of the wireless access point under each of the antenna pattern permutations.

* * * * *